(12) United States Patent
Jeong

(10) Patent No.: US 7,773,273 B2
(45) Date of Patent: Aug. 10, 2010

(54) METHOD AND APPARATUS FOR REMOVING SHOW-THROUGH IN SCANNED IMAGE

(75) Inventor: Young-hoon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 11/952,161

(22) Filed: Dec. 7, 2007

(65) Prior Publication Data

US 2008/0247003 A1 Oct. 9, 2008

(30) Foreign Application Priority Data

Apr. 3, 2007 (KR) .................... 10-2007-0032947

(51) Int. Cl.
*H04N 1/04* (2006.01)
*H04N 1/38* (2006.01)

(52) U.S. Cl. .................. 358/474; 358/497; 358/463; 358/464

(58) Field of Classification Search .......... 358/497, 358/494, 474, 496, 463, 464; 382/275, 318, 382/319, 312
See application file for complete search history.

(56) References Cited

U.S. PATENT DOCUMENTS

| 5,907,413 A * | 5/1999 | Han ...................... 358/497 |
| 6,101,283 A * | 8/2000 | Knox .................... 382/254 |
| 7,145,697 B1 | 12/2006 | Sharma et al. |
| 2003/0218781 A1 | 11/2003 | Suino |
| 2006/0263125 A1 | 11/2006 | Gardner et al. |
| 2006/0263126 A1 * | 11/2006 | Heydinger et al. ........ 399/364 |

FOREIGN PATENT DOCUMENTS

| JP | 10-155088 A | 6/1998 |
| JP | 2004-96245 A | 3/2004 |
| JP | 2004-266619 A | 9/2004 |

* cited by examiner

*Primary Examiner*—Cheukfan Lee
(74) *Attorney, Agent, or Firm*—Sughrue Mion, PLLC

(57) ABSTRACT

Provided are a method and apparatus for removing show-through of a scanned image. The method includes: performing forward scanning on a medium placed on a glass platen of an image scanner; performing backward scanning on the medium; and removing show-through of a forward-scanned image based on a backward-scanned image.

33 Claims, 15 Drawing Sheets

METHOD AND APPARATUS FOR REMOVING SHOW-THROUGH IN SCANNED IMAGE

CROSS-REFERENCE TO RELATED PATENT APPLICATION

This application claims priority from Korean Patent Application No. 10-2007-0032947, filed on Apr. 3, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to image scanning, and in particular, to removing or reducing show-through in a medium during scanning performed with an image scanner.

2. Description of the Related Art

Image scanners (hereinafter called "scanners") optically scan a medium such as a document, a drawing, a photograph, or a film, detect the intensity of light reflected from or transmitted through the medium to obtain image information, and then, process the image information in various ways.

CMOS image sensor (CIS) and charge-coupled device (CCD) are generally used in various scanner applications.

FIG. 1 illustrates the optical structure of a related art CIS type scanner. Referring to FIG. 1, red (R), green (G), and blue (B) beams are sequentially emitted by RGB LEDs onto a medium placed on a glass platen and the light which is reflected from the medium placed on the glass platen is detected by a photo transistor.

FIG. 2 illustrates the optical structure of a related art CCD type scanner.

Referring to FIG. 2, light that is emitted by a lamp and passes through an aperture is then reflected from mirrors and detected by a CCD linear array.

The related art CIS and CCD image sensors are widely used in the art as scanners or multi-function printers.

In the exemplary embodiments described below, the term scanners include but is not limited to multi-function printers and all other devices that can operate according to the previously described mechanisms.

FIGS. 3A and 3B illustrate exemplary embodiments which show-through is present within an image scanned by related art scanning devices.

Referring to FIGS. 3A and 3B, due to the thinness and high light permeability of a medium such as a newspaper or a printing paper, a scanner detects desired information from a front side of the medium and also undesired information from a back side of the medium. This phenomenon is known as show-through. Thus, various techniques have been proposed to remove show-through by a scanner.

For example, U.S. Pat. No. 6,067,170 entitled "Image forming apparatus for indicating completion of scanning for both sides of an original document" (See FIGS. 4 and 5) and Korean Laid-open Patent Application No. 1997-0071165 entitled "A copy paper scanning apparatus and image forming apparatus employing the same" have presented a technique for removing undesired information sensed from a back side of a medium by separately scanning both front and back sides of the medium with an Automatic Document Feeder (ADF) and comparing data scanned from both front and back sides of the medium with each other. That is, show-through information is removed from the back side of the medium by using multiple image input sensors to scan both the front and back sides of the medium in one-pass or by using a turn-over unit.

Another approach for removing show-through has been proposed in "A multiscale approach to restoring scanned color document images with show-through effects" Document Analysis and Recognition, 2003. Proceedings, Seventh International Conference on 3-6 Aug. 2003 page 584-588 vol. 1. The multiscale approach includes scanning a front side of the medium with show-through, analyzing the front side image, and estimating and removing show-through information from the front side image.

However, the above-described approaches require use of an expensive ADF and a plurality of sensors, thus increasing manufacturing costs, design complexity, and failure rate. Furthermore, the multiscale approach that involves scanning the front side image, and estimating and removing show-through information cannot completely eliminate show-through.

SUMMARY OF THE INVENTION

The present invention provides a method and apparatus for easily and efficiently removing show-through by an image scanner with a low-cost existing scanning platform instead of having to use a scanner incorporating a high-cost ADF and a plurality of image sensors.

The present invention also provides a method and apparatus for removing show-through by an image scanner without the need for additional time to remove the show-through.

According to an aspect of the present invention, there is provided a method of removing show-through of an image scanned by an image scanner, including: performing forward scanning on a medium placed on a glass platen in the image scanner; performing backward scanning on the medium; and removing show-through of a forward-scanned image based on a backward-scanned image.

Light intensity for the backward scanning is lower than light intensity for the forward scanning. After performing the forward scanning, the method further includes storing the forward-scanned image in a memory. After removing the show-through of the image, the method further includes storing the resulting image in a memory. The method further includes transmitting the forward-scanned image from which show-through has been removed to another module.

After performing the forward scanning, the method may further include determining a parameter that is used to estimate the amount of show-through of the forward-scanned image. The parameter is determined based on the forward-scanned image. Light intensity is adjusted according to the parameter. Light intensity for the backward scanning is adjusted to be lower than light intensity for the forward scanning. A resolution or sensor characteristics is adjusted according to the parameter.

The resolution for the backward scanning is adjusted to be equal to or lower than resolution for the forward scanning. The backward scanning is performed consecutively after the forward scanning has been performed.

Before performing the forward scanning, the method may further include performing preview scanning on the medium. After performing preview scanning, the method further includes determining a parameter that is used to estimate the amount of show-through of a preview-scanned image. Light intensity is adjusted according to the parameter. Light intensity for the preview scanning is equal to or lower than light intensity for the forward scanning.

Removing show-through of the image may include: converting the backward-scanned image into another image representing a contour of the backward-scanned image; and comparing the other image with the forward-scanned image and removing show-through of the forward-scanned image.

According to another aspect of the present invention, there is provided an apparatus for removing show-through of an image scanned by an image scanner, including: an image sensor irradiating light onto a medium placed on a glass platen, detecting reflected or penetrated light, generating an image signal of the medium, outputting the image signal, and performing forward scanning on the medium, followed by backward scanning; and an image processor removing show-through of the forward-scanned image based on the backward-scanned image.

According to another aspect of the present invention, there is provided a computer readable recording medium storing a program for executing the method of removing show-through. The method of removing show-through of a scanned image includes: performing forward scanning on a medium placed on a glass platen in an image scanner; performing backward scanning on the medium; and removing show-through of a forward-scanned image based on a backward-scanned image.

BRIEF DESCRIPTION OF THE DRAWINGS

The above and other aspects of the present invention will become more apparent from the following detailed description of exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
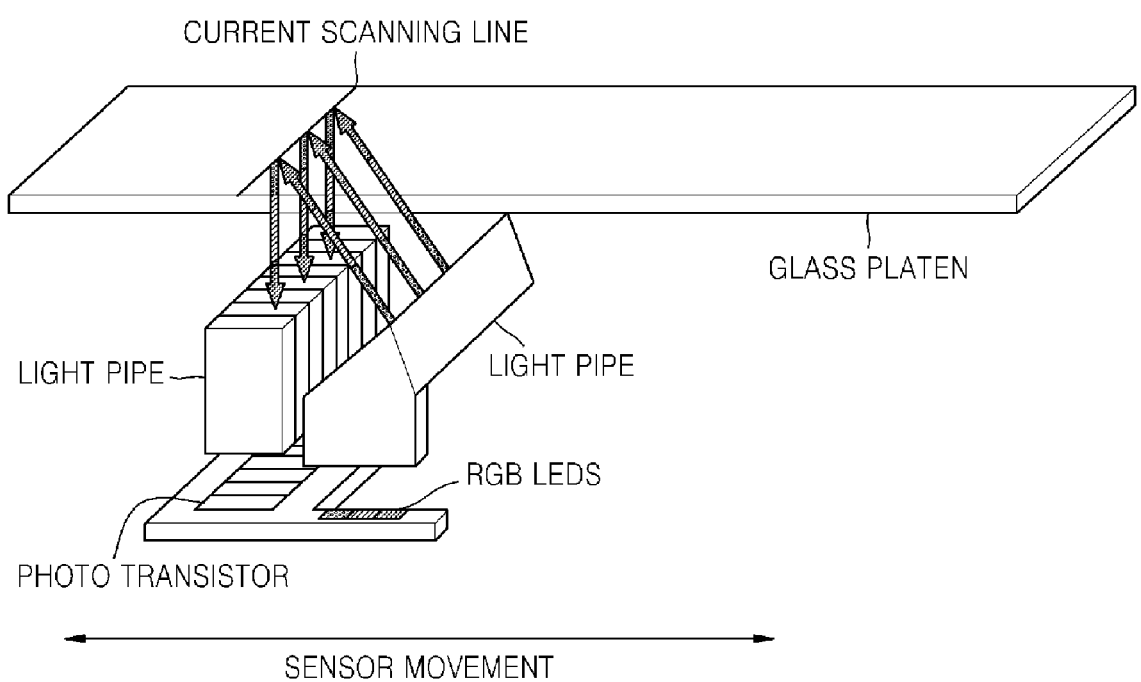
FIG. 1 illustrates the optical structure of a related art CIS type scanner.
Figure 2:
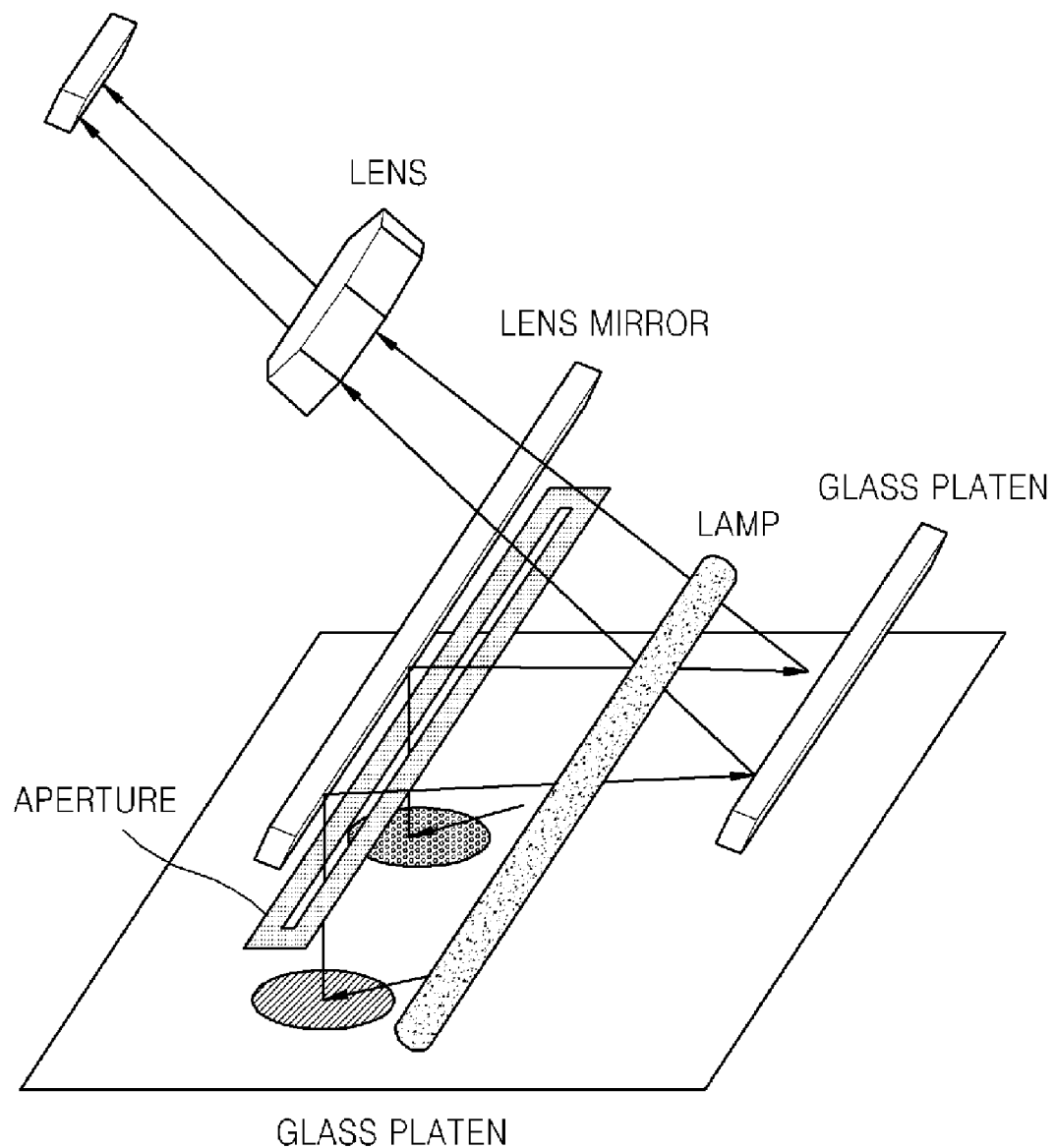
FIG. 2 illustrates the optical structure of a related art CCD type scanner.
Figure 3A:
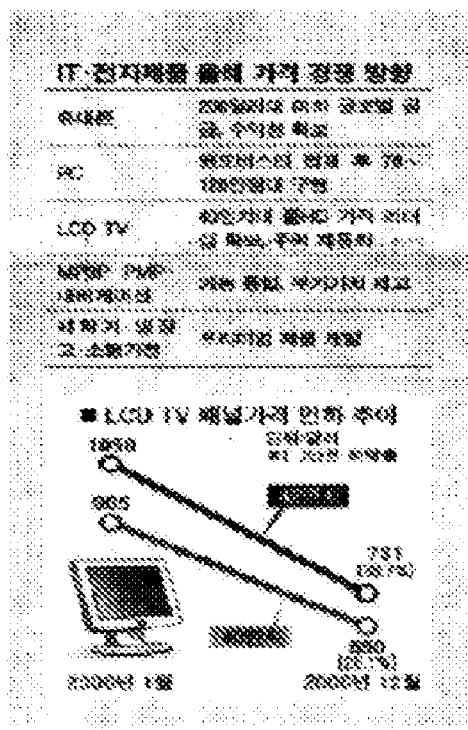
FIGS. 3A and 3B illustrate exemplary embodiments in which show-through is present within an image scanned by related art scanning devices.
Figure 3B:
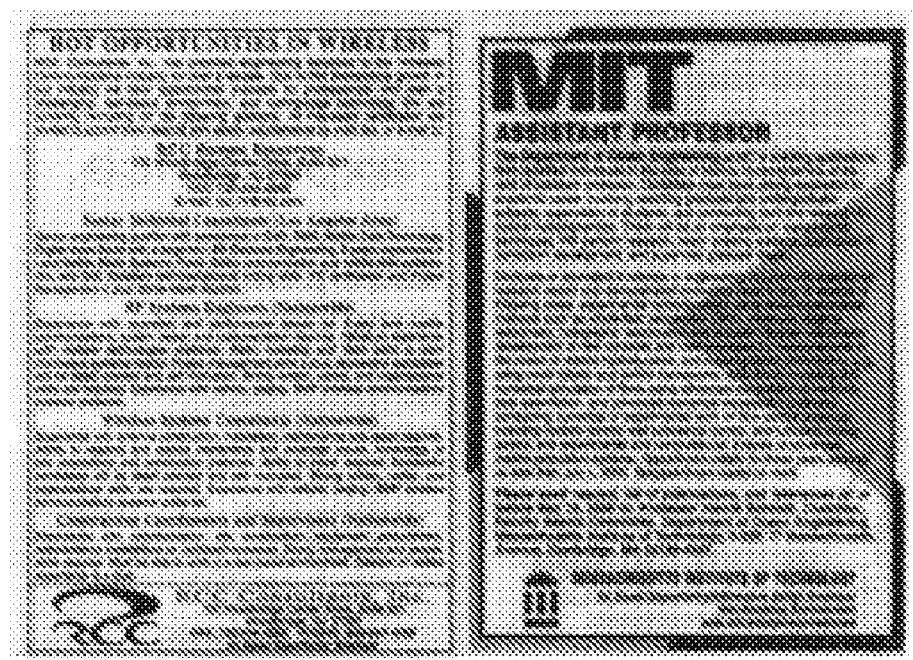
Figure 4:
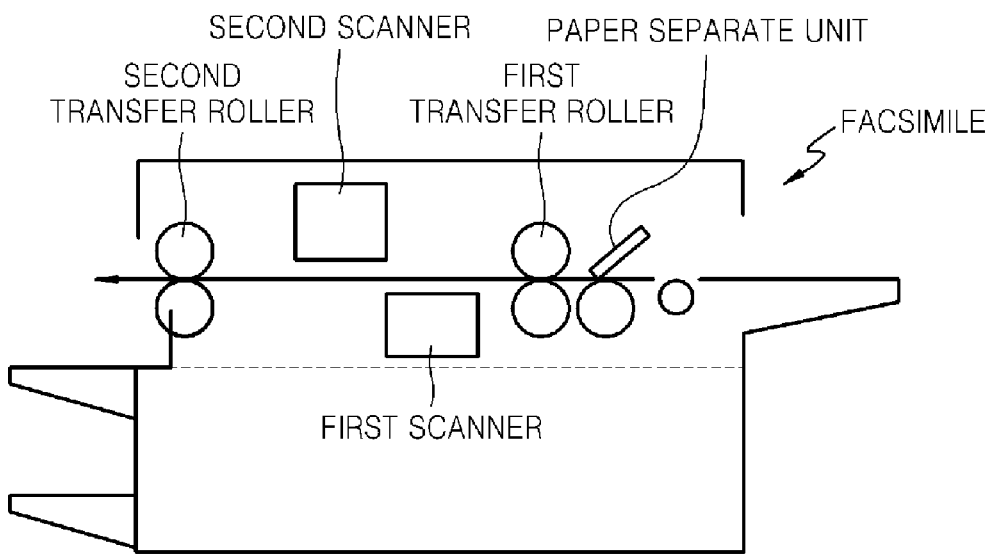
FIGS. 4 and 5 illustrate conventional apparatuses for removing show-through by a scanner.
Figure 5:
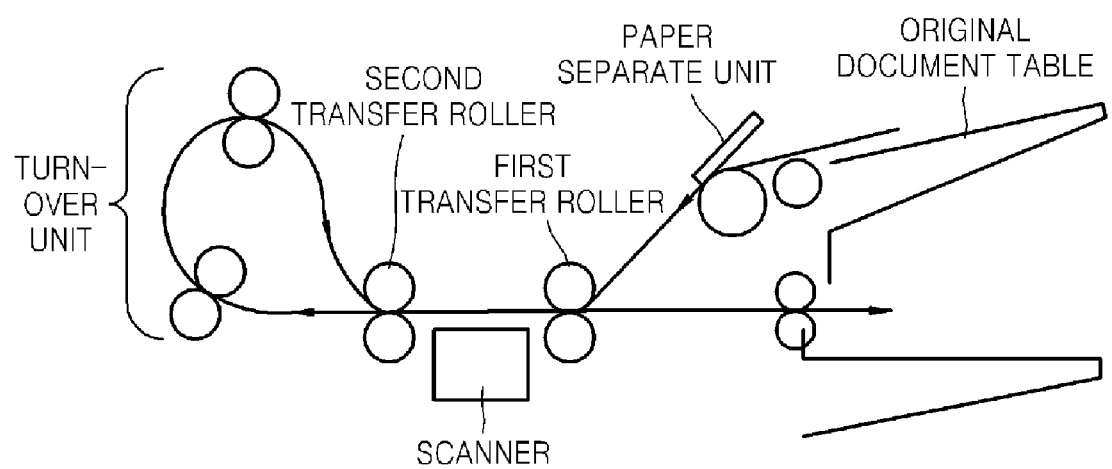
Figure 6:
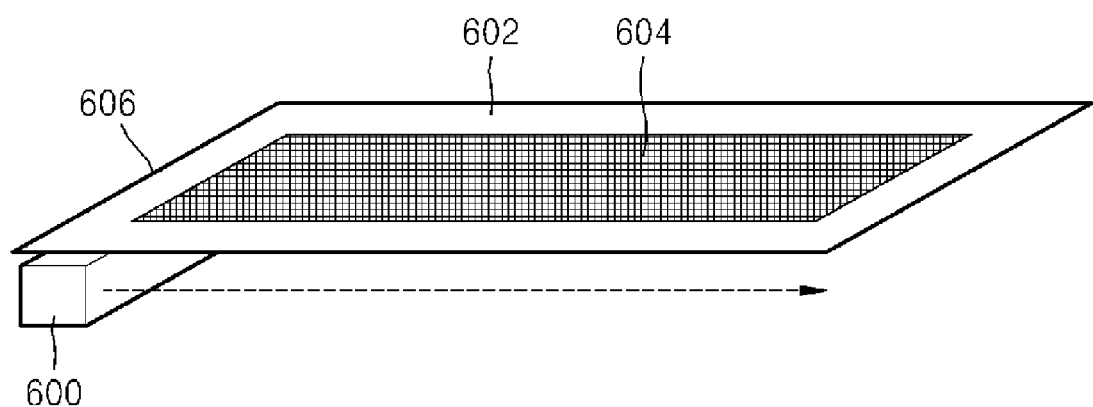
FIG. 6 illustrates forward scanning that can be applied to exemplary embodiments of the present invention.

FIG. 6 illustrates forward scanning that can be applied to exemplary embodiments of the present invention.

Referring to FIG. 6, forward scanning refers to obtaining two-dimensional (2D) image information of a medium 604 (including but not limited to paper to be scanned) placed on a glass platen 602 as an image sensor module 600 such as a CCD sensor module or a CIS module (hereinafter referred to as the "image sensor") moves in a forward direction (indicated by the arrow in FIG. 6) from an initial position 606.

That is, forward scanning is performed to obtain 2D information as the image sensor 600 that includes a light source moves longitudinally with respect to the glass platen 602. If light is turned on with an appropriate brightness, the image sensor 600 moves in a single direction to acquire an image at a preset resolution within a preset region and transmits the image to a memory or another module.

According to a conventional scanning technique, after the forward scanning is completed, the light and the image sensor 600 are turned off and the image sensor 600 returns to the initial position 606.

Figure 7:
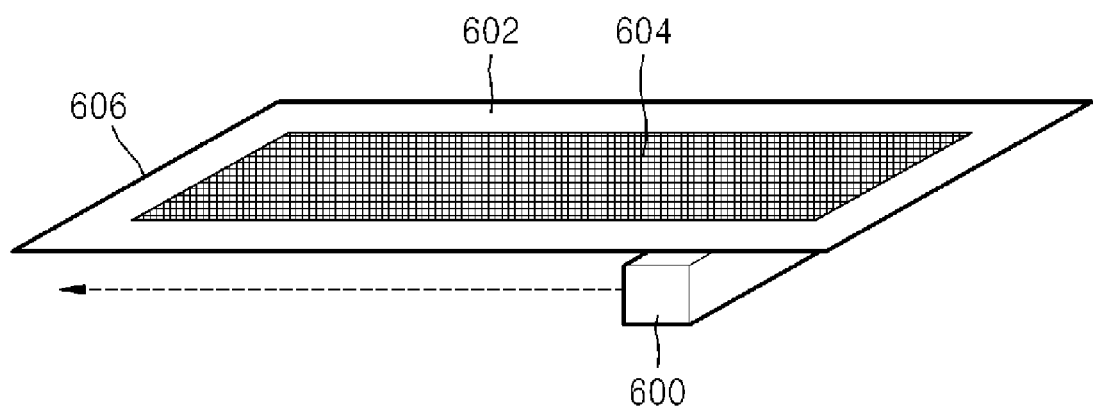
FIG. 7 illustrates backward scanning that can be applied to exemplary embodiments of the present invention.

FIG. 7 illustrates backward scanning that can be applied to exemplary embodiments of the present invention.

Referring to FIG. 7, backward scanning refers to obtaining 2D image information of the medium 604 placed on the glass platen 602 as the image sensor 600 moves in an opposite direction to the forward direction (in a direction indicated by arrow in FIG. 7), after forward scanning. The backward scanning may be performed consecutively after the forward scanning has been performed, with the medium 604 fixed on the glass platen 602. The backward scanning may be performed differently than the forward scanning in regard to light intensity, resolution, and characteristics of the image sensor 600 by an analog front end (AFE).

Figure 8:
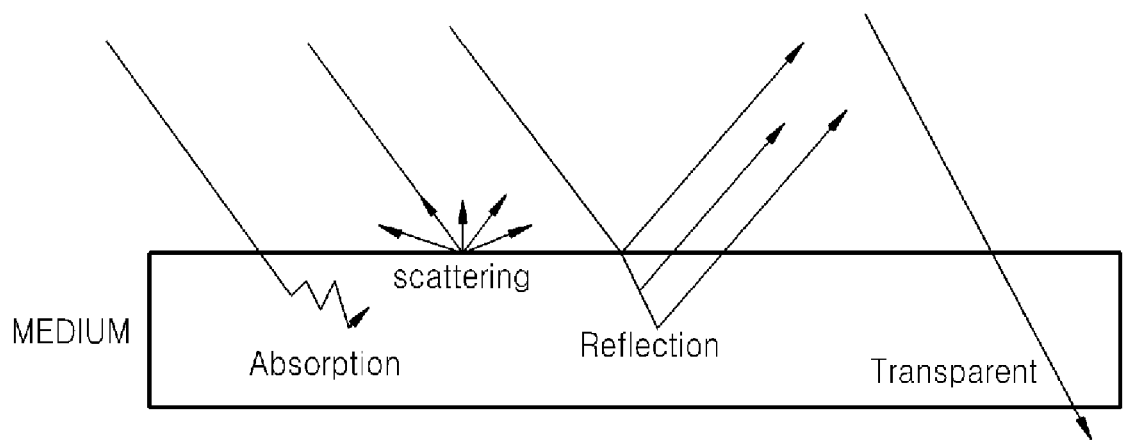
FIGS. 8 through 10 illustrate the cause of show-through in a medium during scanning by an image scanner and a variation in the amount of show-through according to light intensity.
Figure 9:
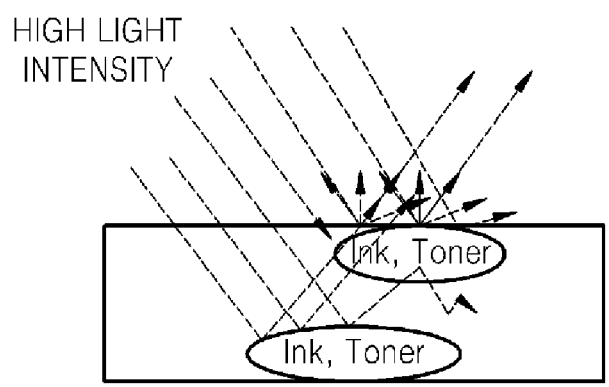
Figure 10:
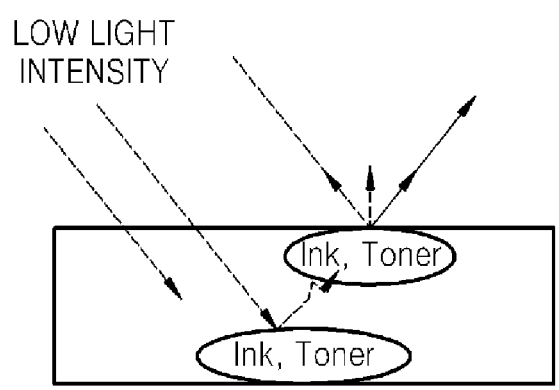

FIGS. 8 through 10 illustrate causes of show-through in a medium during scanning by an image scanner and a change in the amount of show-through according to light intensity.

Referring to FIG. 8, a dye such as ink or a toner is sprayed, deposited, or solidified on both sides of a medium consisting of thin fibers for penetration. Light that penetrates into the medium is absorbed, scattered, reflected, or passed through the medium depending on the type, thickness, permeability, or the presence of impurities in the medium.

When a dye such as ink or toner is applied to a medium as illustrated in FIGS. 9 and 10, light is reflected by the dye. In this case, the degree of reflection may vary depending on the intensity of light that penetrates into the medium. FIG. 9 illustrates the intensity of light that is reflected by the dye such as ink or the toner applied to a back side of the medium, which is opposite to a scanned side, when the penetrating light has a high intensity. Consequently, the image sensor 600 detects reflected light, whereby a show-through phenomenon is generated.

Conversely, when light that penetrates into the medium has a low intensity, light irradiated onto the dye that is applied to the back side of the medium, which is opposite to the scanned side, is not reflected by the dye, whereby a show-through phenomenon is not generated. Because the penetrating light has a low intensity, the light detected by the image sensor 600 also has a low intensity. Thus, an image obtained by scanning has a low brightness.

The amount of show-through may vary depending on the characteristics of the medium such as thickness, fiber density, and permeability. For example, if light is irradiated onto ink that is sprayed and permeated into both sides of thin paper, the light passes through the fibers of the paper and is reflected by the ink, thereby generating a show-through phenomenon.

When a light source has a low intensity, only a small amount of show-through is generated, and in this case, a desired output quality cannot be achieved due to low light intensity.

Thus, to solve the above-described drawbacks, i.e., remove undesirable show-through effects, the exemplary embodiments adopt backward scanning to an existing forward scanning process. During the backward scanning, according to the exemplary embodiment, a CCD or CIS sensor moves in a direction opposite to the direction of forward scanning, and the backward scanning may also be performed at an equal resolution to a resolution for forward scanning or at a lower resolution for fast scanning.

Figure 11:
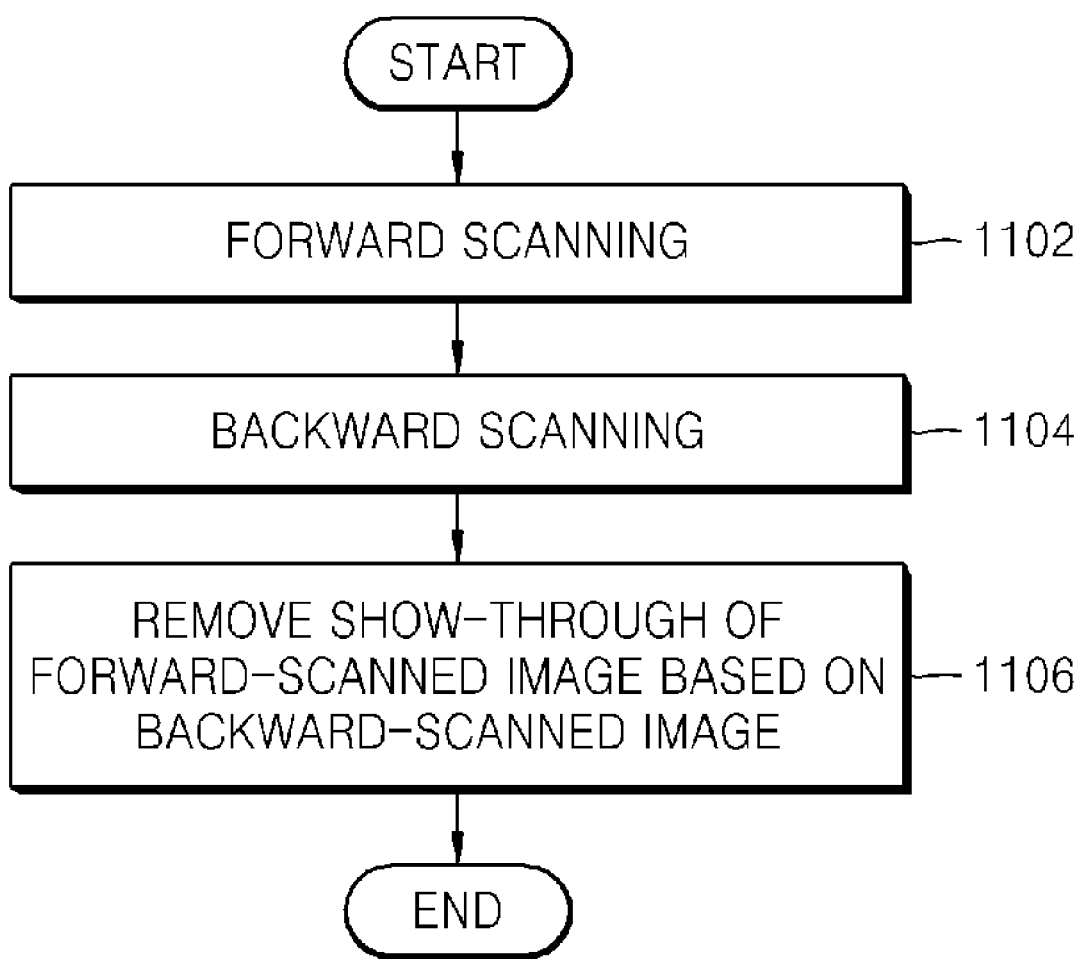
FIG. 11 is a flowchart illustrating a method of removing show-through by an image scanner according to an exemplary embodiment of the present invention.

FIG. 11 is a flowchart illustrating a method of removing show-through by an image scanner according to an exemplary embodiment of the present invention. Referring to FIGS. 6 and 11, in operation 1102, the image sensor 600 performs forward scanning on the medium 604 placed on the glass platen 602 of the image scanner. The forward scanning is performed in the same way as described above with reference to FIG. 6.

In operation 1104, the image sensor 600 then performs backward scanning on the medium 604 and the backward scanning may be performed immediately after the forward scanning has been performed, thus causing little time delay.

Lastly, in operation 1106, the image sensor 600 removes show-through of the forward-scanned image based on the backward-scanned image, and various techniques may be utilized for removing show-through as will be described later with reference to FIG. 15.

Figure 12:
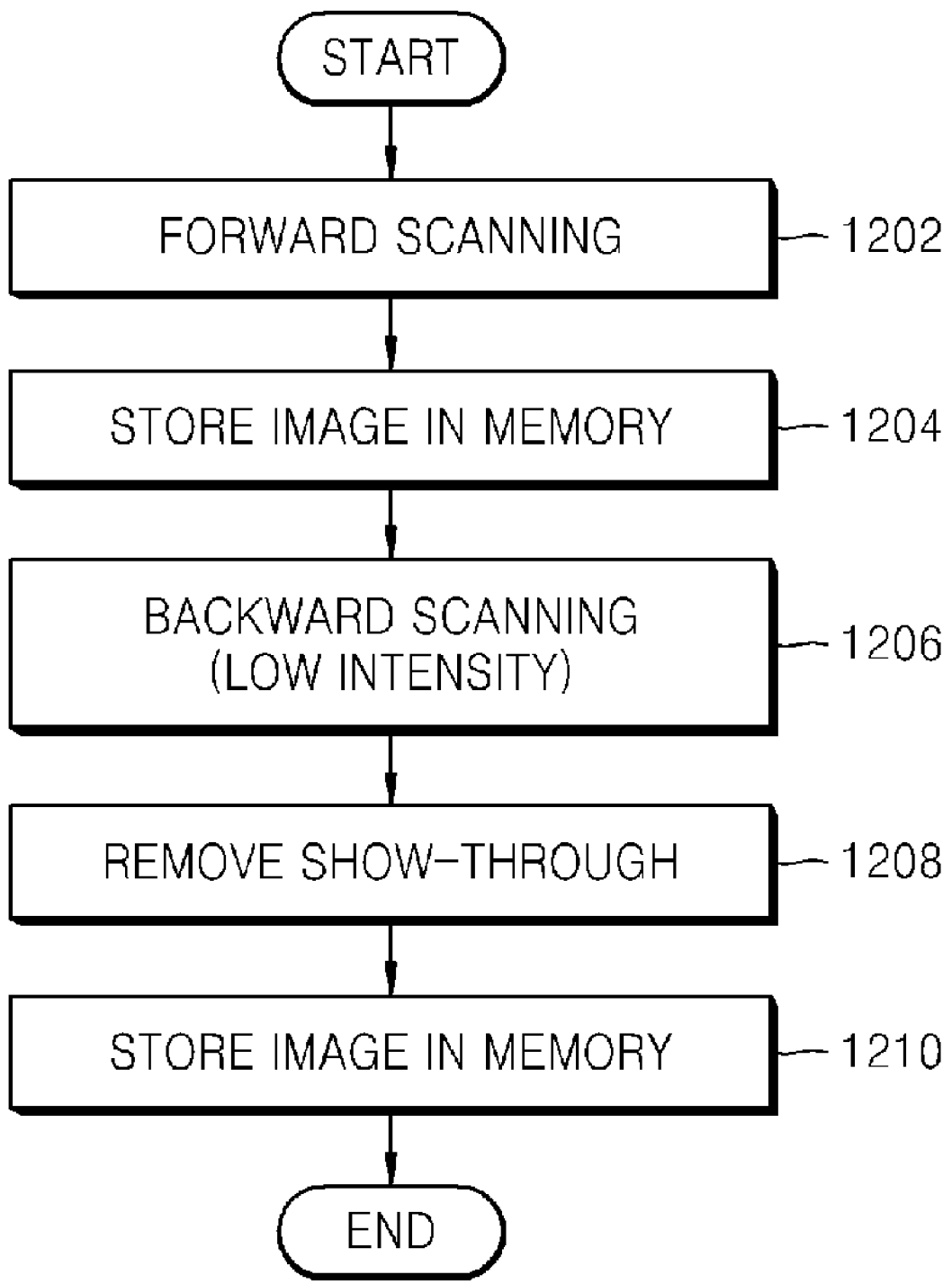
FIG. 12 is a flowchart illustrating a method of removing show-through by an image scanner according to an exemplary embodiment of the present invention.

FIG. 12 is a flowchart illustrating a method of removing show-through by an image scanner according to an exemplary embodiment of the present invention.

Referring to FIGS. 6, 7 and 12, in operation 1202, the image sensor 600 performs forward scanning on the medium 604 placed on the glass platen 602. In operation 1204, the forward-scanned image is stored in a memory.

Then, in operation 1206, backward scanning is performed on the medium 604, preferably, immediately after the forward scanning has been performed.

In this case, the intensity of light emitted by the image sensor 600 during the backward scanning is adjusted to be lower than the intensity of light during the forward scanning. As described above with reference to FIGS. 8 through 10, when light irradiated onto the medium 604 has a low intensity, the light irradiated onto the dye that is applied to the back side of the medium 604, which is opposite to the scanned side, is reflected by the dye but does not penetrate through the back side of the medium 604. Thus, a show-through phenomenon does not occur.

Thereafter, in operation 1208, the image sensor 600 removes show-through of the forward-scanned image based on the backward-scanned image, and various techniques may be employed to remove the show-through of the forward-scanned image.

Lastly, in operation 1210, the forward-scanned image from which show-through has been removed is stored in the memory. The resulting forward-scanned image may also be transmitted to another module.

Figure 13:
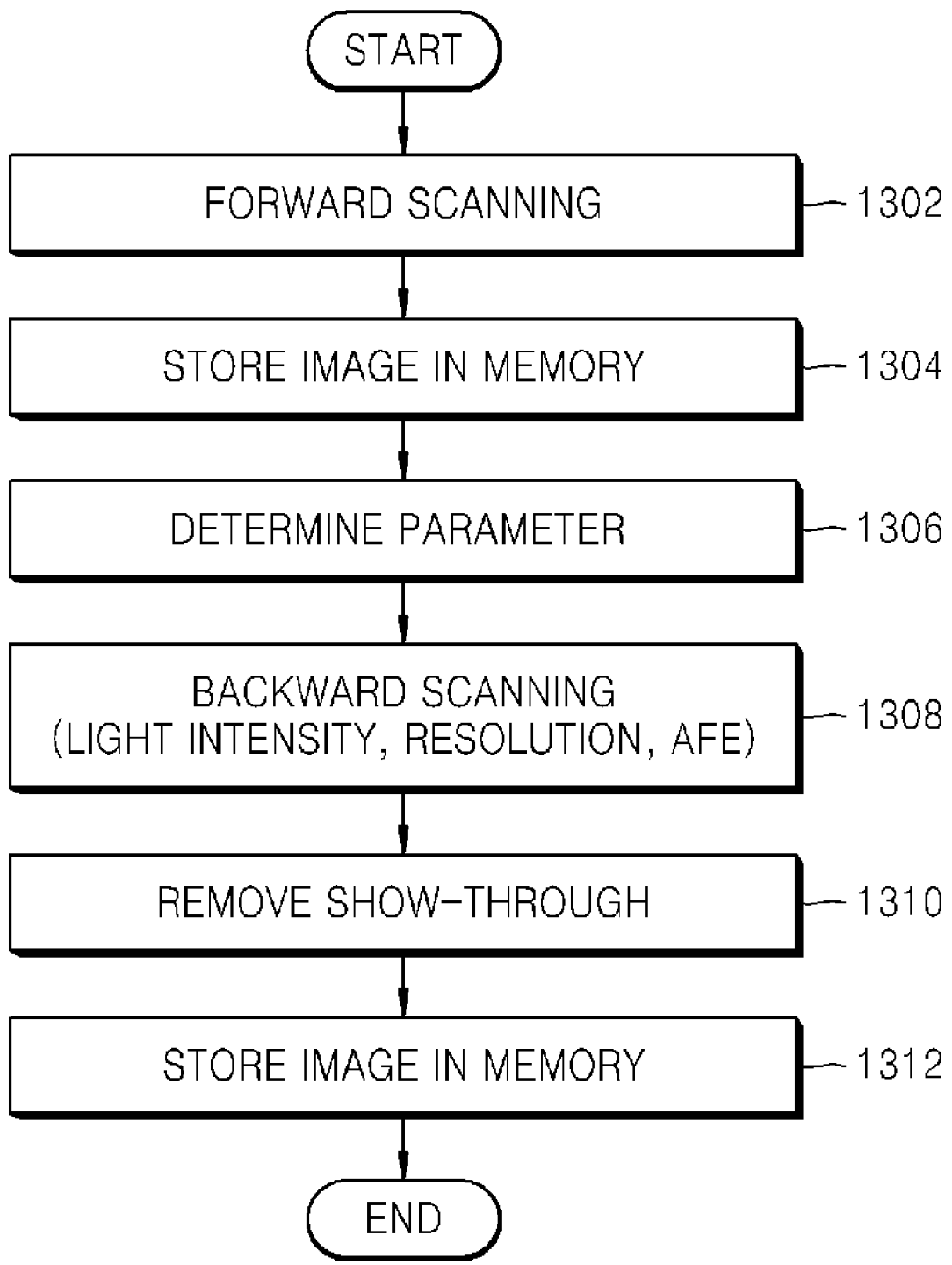
FIG. 13 is a flowchart illustrating a method of removing show-through by an image scanner according to an exemplary embodiment of the present invention.

FIG. 13 is a flowchart illustrating a method of removing show-through by an image scanner according to an exemplary embodiment of the present invention.

Referring to FIGS. 6, 7 and 13, in operation 1302, the image sensor 600 performs forward scanning on the medium 604 placed on the glass platen 602 of the image scanner. In operation 1304, the forward-scanned image is stored in a memory.

Then, a parameter L of the medium 604 is determined in operation 1306, wherein the parameter L is used to estimate the amount of show-through in the medium 604. For example, the parameter L may have a value ranging from 0 to 9 depending on the amount of show-through in the medium 604. The parameter L of the medium 604 such as newspaper with a large amount of show-through from the back side thereof has a value of 9. The parameter L of the medium 604 such as glossy paper with a small amount of show-through from the back side thereof has a value of 0.

Various techniques may be used for determining the value of the parameter L as will be described in detail later with reference to FIG. 14.

In operation 1308, backward scanning is performed on the medium 604, preferably, immediately after the forwarding has been performed.

In this exemplary embodiment, the intensity of light emitted by the image sensor 600 during backward scanning is adjusted to be lower than the intensity of light during the forward scanning.

The backward scanning is also performed on the medium 604 at a resolution or setting of the image sensor 600 by an AFE (not shown) that is adjusted according to the value of the parameter L determined in operation 1306. Also according to this exemplary embodiment, the AFE is incorporated into the image sensor 600.

Alternatively, regardless of the value of the parameter L, the resolution may be adjusted to be equal to the resolution for forward scanning or lower than that for fast scanning. That is, because the backward scanning according to the exemplary embodiment is used for removing show-through, high resolution for forward scanning is not needed.

In operation 1310, the image sensor 600 then removes show-through of the forward-scanned image based on the backward-scanned image, and various techniques may be employed to remove show-through, which will be described in detail later with reference to FIG. 16.

Lastly, in operation 1312, the forward-scanned image from which show-through has been removed is stored in the memory. The resulting forward-scanned image may also be transmitted to another module requiring the use of the image.

Figure 14:
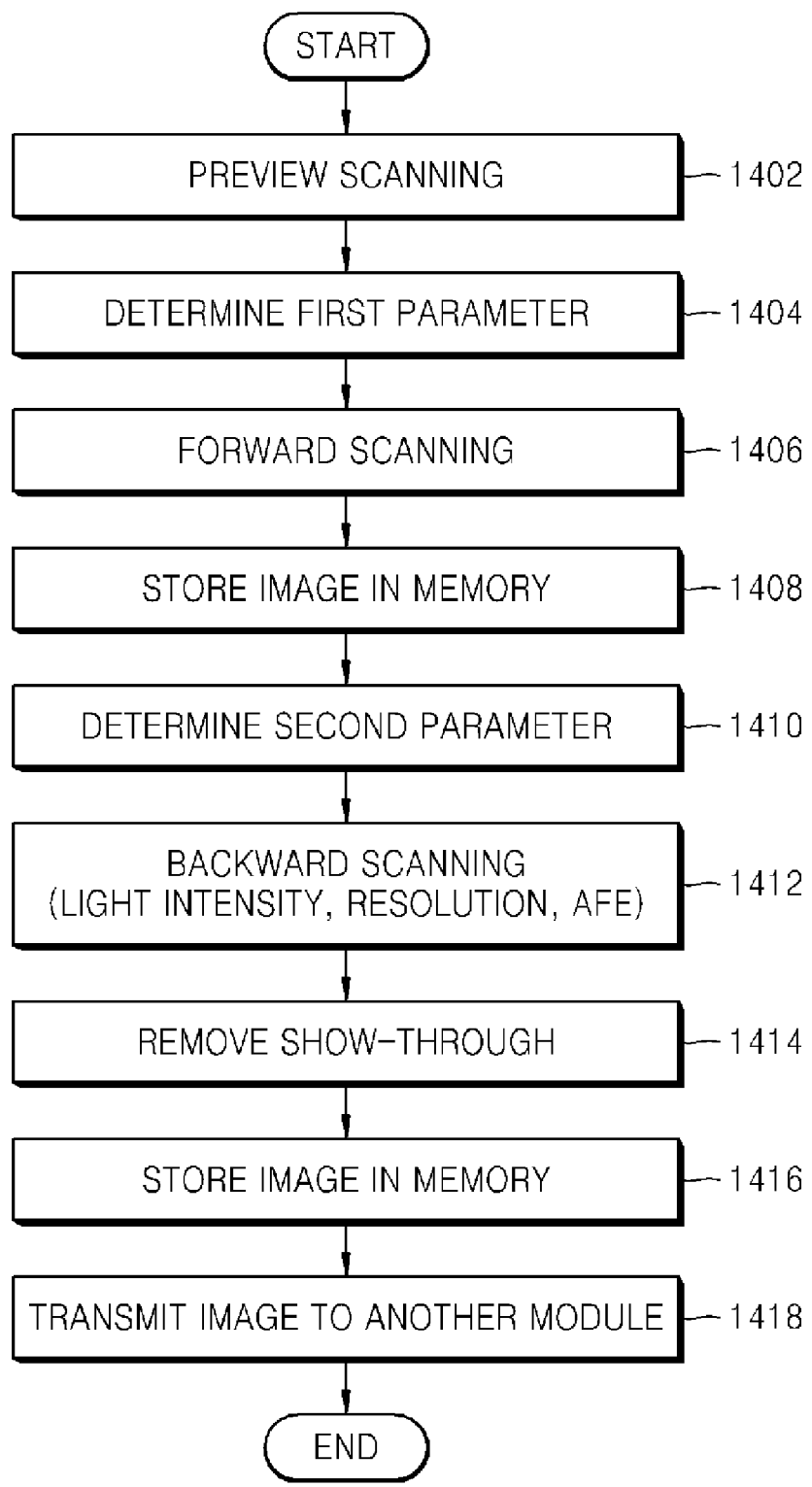
FIG. 14 is a flowchart illustrating a method of removing show-through by an image scanner according to an exemplary embodiment of the present invention.

FIG. 14 is a flowchart illustrating a method of removing show-through by an image scanner according to another exemplary embodiment of the present invention.

Referring to FIGS. 6, 7 and 14, in operation 1402, the image sensor 600 performs preview scanning on the medium 604 placed on the glass platen 602 of the image scanner, and the preview scanning is performed at high speed before scanning the actual image data so as to determine factors that affect image quality, such as scanning region, brightness, light intensity, and pattern removal.

To remove show-through, the light intensity for preview scanning is usually equal to the light intensity for forward scanning, however, the light intensity may be lower than that for forward scanning.

After performing the preview scanning, in operation 1404, a first parameter for the medium 604 is determined in order to estimate the amount of show-through in the medium 604, and the first parameter may be set to a parameter value preset for the type of a medium that is determined by a user after the preview scanning has been performed.

While the method according to the present embodiment includes operation 1404 for determining the first parameter as well as operation 1410 for determining a second parameter, which is to be described later, the method may include one or both operations 1404 and 1410 if necessary to determine the first or second parameter.

Thereafter, the image sensor 600 performs forward scanning on the medium 604 (1406), and the resulting forward-scanned image is stored in the memory (1408).

The second parameter for the medium 604 is then determined (1410) to check the show-through phenomenon with respect to the permeability of the medium 604. The determined second parameter is output and used to adjust the characteristics of sensor by an AFE or light intensity.

Various techniques may be used to determine a value of parameter and one approach of determining the value of the parameter is to use a forward-scanned image. More specifically, while images from a scanned side (a front side of a medium) have strong high frequency components, signals penetrate through the medium have strong low frequency components. Thus, using these characteristics, an image that has penetrated through the medium can be extracted by performing high resolution forward scanning and applying a low-pass filter. The value of the parameter can then be determined based on the extracted image. Another exemplary embodiment of determining the value of the parameter includes inputting the amount of show-through based on an image scanned during preview scanning and determining the value of the parameter using the data input by the user. Another exemplary embodiment includes determining the type of a medium such as newspaper, glossy paper, book, magazine, or printing medium and using a parameter value preset for the type of medium determined by a scanner user as the parameter value. Additionally, another exemplary embodiment uses a fixed parameter value.

Other various techniques than described above may be used to determine the first and second parameters in operations 1404 and 1410.

After determining the second parameter, backward scanning is performed on the medium 604. Since the backward scanning is performed in the same manner as described above with reference to FIGS. 7 and 13, a detailed explanation thereof will not be given. In this case, the intensity of light emitted by the image sensor 600 during the backward scanning is adjusted to be lower than the intensity of light during the forward scanning. Furthermore, light intensity, resolution, or sensor characteristics by an AFE may be adjusted according to the first and second parameters determined in operation 1404 or 1410.

Thereafter, the image sensor 600 removes show-through of the forward-scanned image based on the backward-scanned image (1414), and various techniques may be employed to remove the show-through of the forward-scanned image.

FIGS. 16A through 16D illustrate a method of removing show-through using forward and backward-scanned images according to an embodiment of the present invention.

Figure 16A:
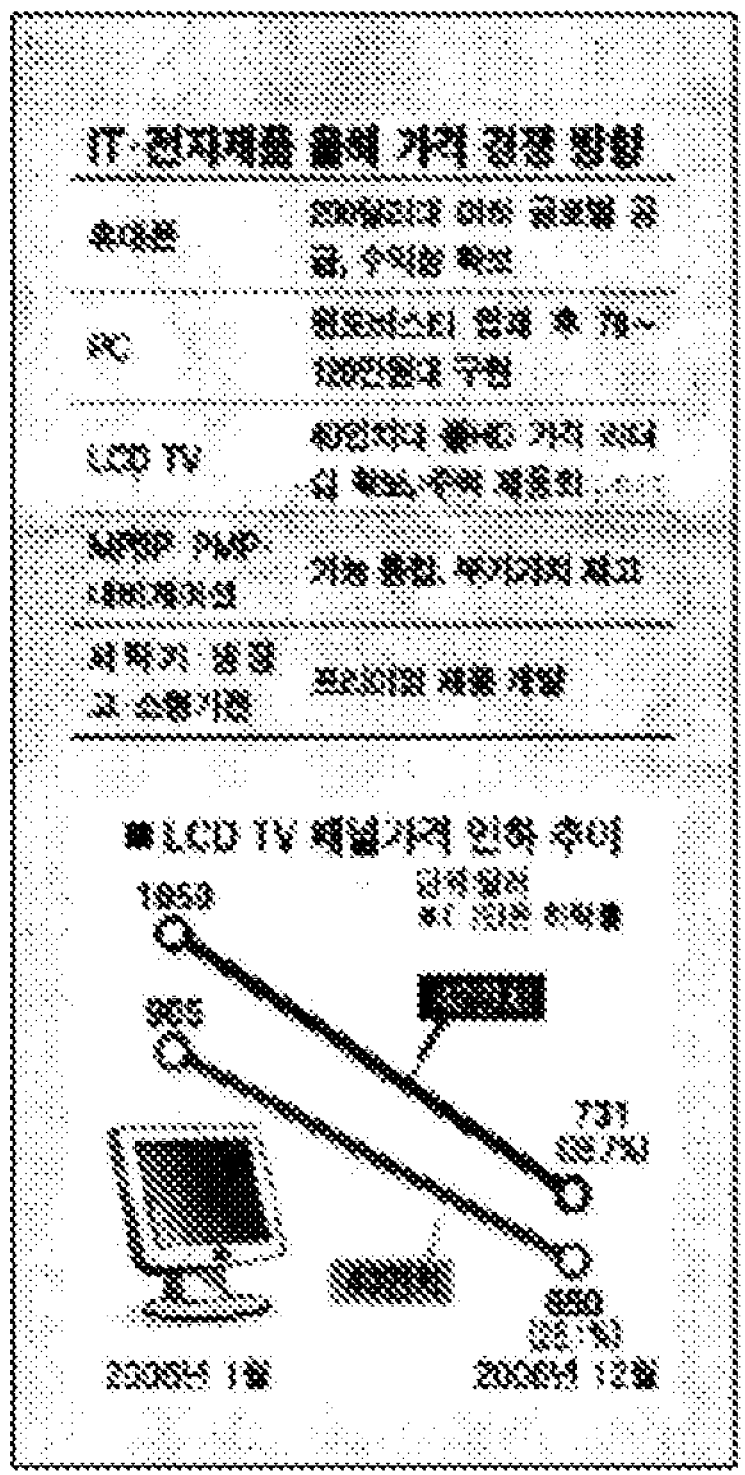
FIGS. 16A through 16D illustrate an exemplary embodiment of removing show-through using forward and backward-scanned images.
Figure 16B:
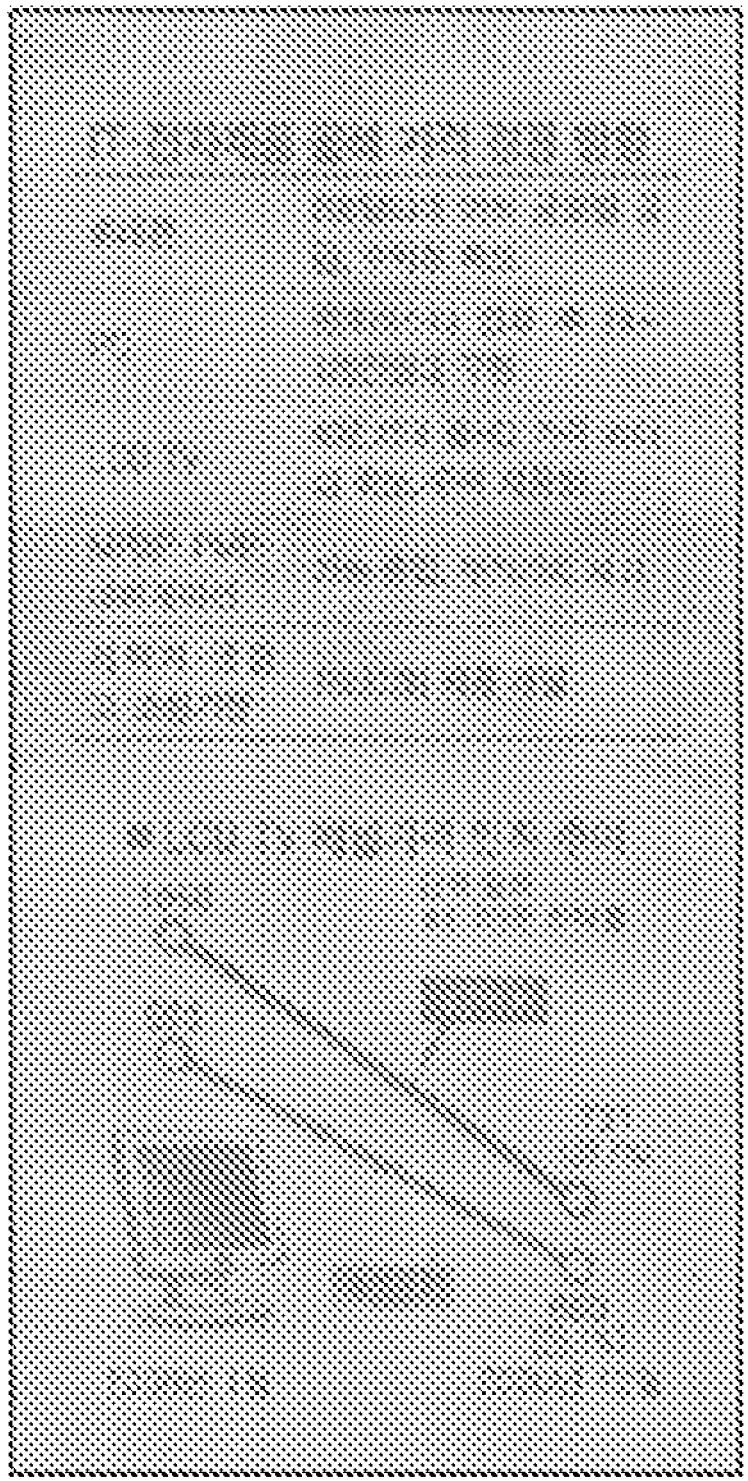
Figure 16C:
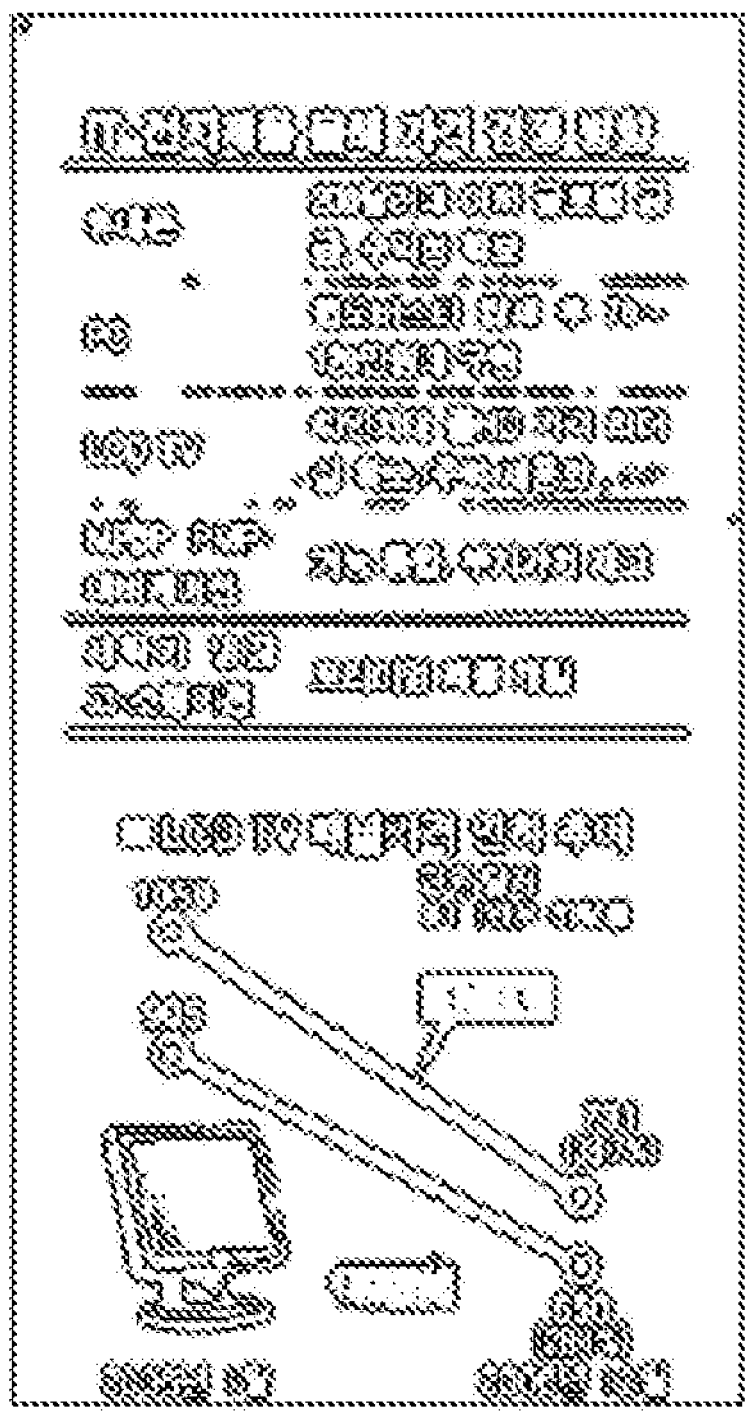
Figure 16D:
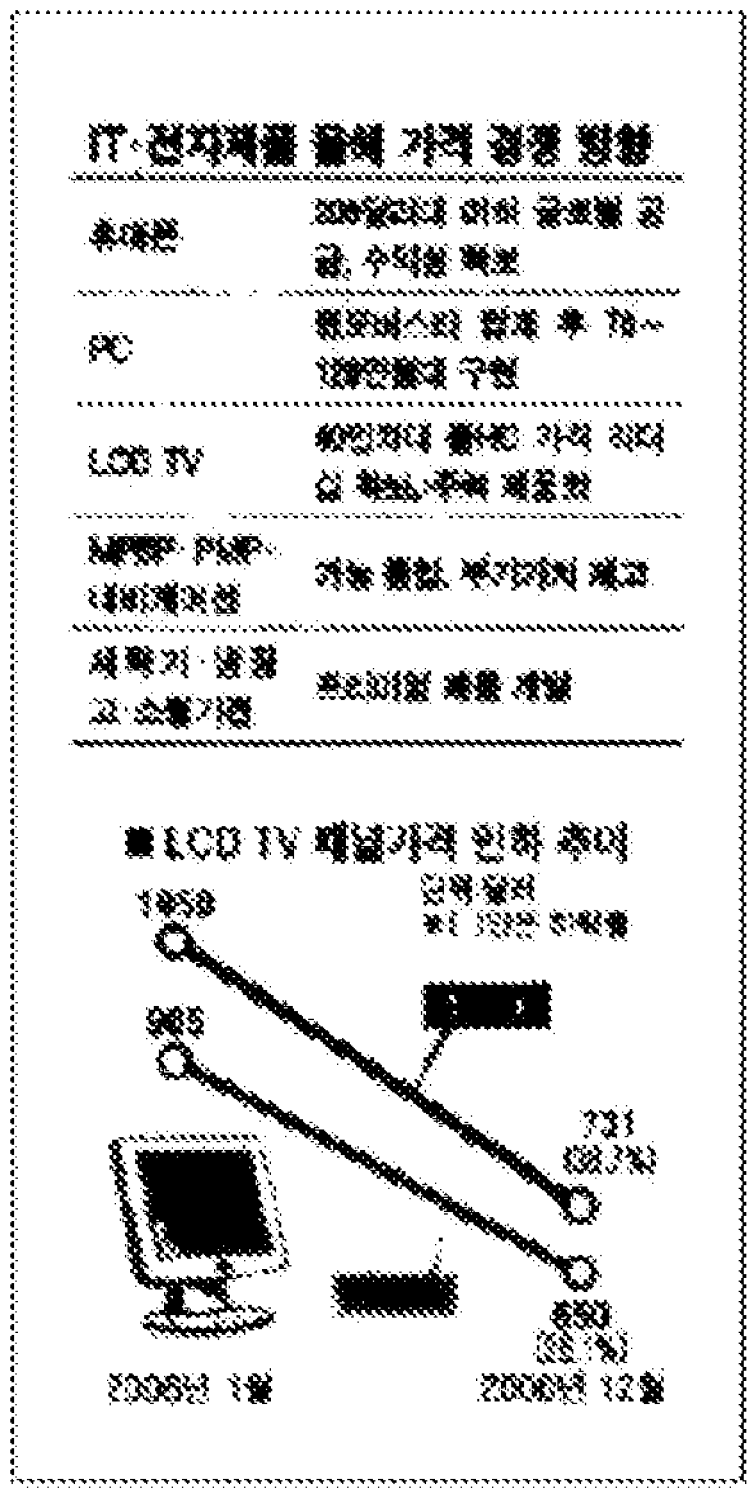

FIG. 16A illustrates a forward-scanned image. Referring to FIG. 16A, forward scanning is performed at appropriate light intensity, however, show-through from the back side of a medium is visible in the forward-scanned image. FIG. 16B illustrates a low brightness image without show-through, which is obtained by emitting light having a preset low intensity. FIG. 16C illustrates an example of converting the image illustrated in FIG. 16B into an image representing a detected contour using a series of image processing operations. FIG. 16D illustrates an image that is obtained by comparing the forward-scanned image illustrated in FIG. 16A with the image illustrated in FIG. 16C and removing show-through of the image in FIG. 16A.

The above-described techniques for removing show-through are to be construed as exemplary only. That is, after or simultaneously with backward scanning, it is possible to extract a front side image from which show-through information has been removed from a forward-scanned image by means of a plurality of image processing techniques.

Returning to FIG. 14, the forward-scanned image from which show-through has been removed is stored in the memory in operation 1416, and then, transmitted to another module requiring the use of the image in operation 1418.

Figure 15:
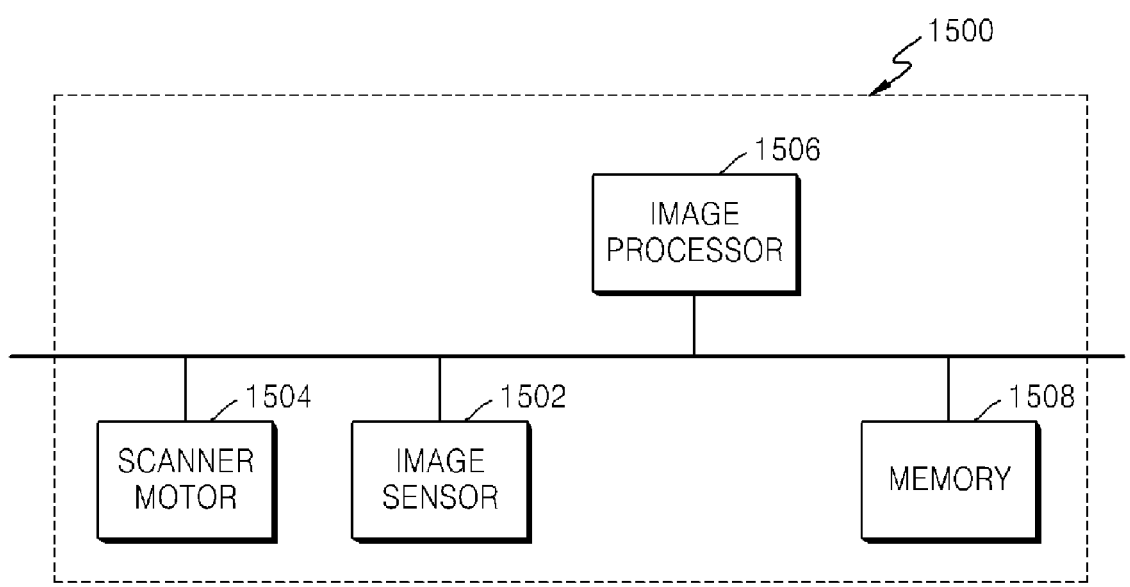
FIG. 15 illustrates an apparatus for removing show-through by an image scanner according to an exemplary embodiment of the present invention.

FIG. 15 illustrates an apparatus 1500 for removing show-through by an image scanner according to an exemplary embodiment of the present invention.

Referring to FIG. 15, the apparatus 1500 for removing show-through includes an image sensor 1502 and an image processor 1506.

The image sensor 1502 irradiates light onto a medium (not shown) placed on an image scanner (not shown), detects reflected or penetrated light, generates an image signal of the medium, and outputs the image signal. According to the exemplary embodiment, the image sensor 1502 performs forward scanning, and then backward scanning. The image sensor 1502 also includes a light source that emits light toward the medium and an AFE (not shown).

Some examples of the image sensor 1502 include but are not limited to a CCD image sensor and a CIS image sensor.

The image processor 1506 removes show-through of a forward-scanned image using an image scanned backward by the image sensor 1502. Since various techniques for removing show-through have been described above in detail, a further explanation is not given.

The image processor 1506 may determine a parameter that is used to estimate the amount of show-through in the medium. The image sensor 1502 adjusts light intensity according to the parameter determined by the image processor 1506 and performs backward scanning on the medium at the adjusted light intensity. For example, the image sensor 1502 may adjust the light intensity during the backward scanning to be lower than the light intensity during the forward scanning. The image sensor 1502 may also adjust a resolution or sensor characteristics according to the parameter for backward scanning.

As described above with reference to FIG. 14, the image sensor 1502 may perform preview scanning before forward scanning in order to determine the parameter. Light intensity, resolution, and sensor characteristics by the AFE may be adjusted according to the parameter for backward scanning.

The apparatus 1500 for removing show-through according to the exemplary embodiment further includes a scanner motor 1504 that moves the image sensor 1502 so as to perform forward and backward scanning.

The apparatus 1500 further includes a memory 1508 for storing a forward-scanned image or an image from which show-through has been removed by the image processor 1506.

As described above, the present invention proposes a method and apparatus for removing show-through of an image of a medium using a low-cost, single image sensor instead of a scanner including an Automatic Document Feeder (ADF) or a plurality of image sensors.

A conventional scanner turns off a light source and an image sensor after forward scanning has been performed and moves the image sensor back to the original position. However, an image scanner according to the present invention compares a forward-scanned image with a low resolution, low brightness image without show-through that is obtained by performing backward scanning at adjusted light intensity, resolution, or sensor characteristics by an AFE. The image scanner then removes the show-through of the forward-scanned image by means of a series of image processing operations, thus obtaining a clean image without show-through.

An image scanner according to the present invention may be a multi-function printer or any other device that can operate according to the above-described mechanism.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be freely made therein without departing from the spirit and scope of the present invention as defined by the following claims or their equivalent.

As described above, a method and apparatus for removing show-through by an image scanner according to the present invention allows removal of show-through of a forward-scanned image based on a backward-scanned image that is obtained by scanning a medium placed on a glass platen in an image scanner at low light intensity. Thus, the present invention allows easy and efficient removal of show-through by an image scanner using a low-cost existing scanning platform instead of a scanner incorporating a high-cost ADF and a plurality of image sensors.

The method and apparatus for removing show-through by an image scanner according to the present invention also enable removal of show-through during a time duration during which the image sensor moves back to the original position after forward scanning has been performed without the need for additional time.

What is claimed is:

1. A method of removing show-through of an image scanned by an image scanner, the method comprising:
   performing forward scanning on a medium placed on a glass platen of the image scanner to generate a forward-scanned image;
   determining a parameter for estimating an amount of show-through of the forward-scanned image;
   performing backward scanning on the medium to generate a backward-scanned image; and
   removing show-through of the forward-scanned image based on the backward-scanned image.

2. The method of claim 1, wherein a light intensity for the backward scanning is lower than a light intensity for the forward scanning.

3. The method of claim 1, further comprising: storing the forward-scanned image in a memory after the performing the forward scanning.

4. The method of claim 1, further comprising: storing in a memory the forward-scanned image from which the show-through has been removed.

5. The method of claim 1, further comprising: transmitting the forward-scanned image from which the show-through has been removed to a module.

6. The method of claim 1, wherein a characteristic of the backward scanning is adjusted based on the determined parameter.

7. The method of claim 1, wherein the parameter is determined based on the forward-scanned image.

8. The method of claim 1, wherein a light intensity for the backward scanning is adjusted according to the parameter.

9. The method of claim 8, wherein the light intensity for the backward scanning is adjusted to be lower than a light intensity for the forward scanning according to the parameter.

10. The method of claim 1, wherein the medium is scanned at a resolution or a sensor characteristic that is adjusted according to the parameter.

11. The method of claim 1, wherein the backward scanning is performed consecutively after the forward scanning has been performed.

12. A computer readable recording medium which stores a program for executing the method of claim 1.

13. A method of removing show-through of an image scanned by an image scanner, the method comprising:
   performing forward scanning on a medium placed on a glass platen of the image scanner to generate a forward-scanned image;
   performing backward scanning on the medium to generate a backward-scanned image; and
   removing show-through of the forward-scanned image based on the backward-scanned image,
   wherein a resolution for the backward scanning is adjusted to be equal to or lower than a resolution for the forward scanning.

14. A method of removing show-through of an image scanned by an image scanner, the method comprising:
   performing preview scanning on a medium placed on a glass platen of the image scanner;
   determining a parameter that is used to estimate the amount of show-through of a preview-scanned image;
   performing forward scanning on the medium to generate a forward-scanned image;
   performing backward scanning on the medium to generate a backward-scanned image; and
   removing show-through of the forward-scanned image based on the backward-scanned image.

15. The method of claim 14, wherein a light intensity for the backward scanning is adjusted according to the parameter.

16. The method of claim 14, wherein a light intensity for the preview scanning is equal to or lower than a light intensity for the forward scanning.

17. A method of removing show-through of an image scanned by an image scanner, the method comprising:
   performing forward scanning on a medium placed on a glass platen of the image scanner to generate a forward-scanned image;
   performing backward scanning on the medium to generate a backward-scanned image; and
   removing show-through of the forward-scanned image based on the backward-scanned image,
   wherein the removing the show-through of the forward-scanned image comprises:
   converting the backward-scanned image into another image representing a contour of the backward-scanned image by means of image processing; and
   comparing the other image with the forward-scanned image and removing the show-through of the forward-scanned image.

18. An apparatus for removing show-through of an image scanned by an image scanner, the apparatus comprising:
   an image sensor which irradiates light onto a medium placed on a glass platen, detects reflected or penetrated light, generates an image signal of the medium, outputs the image signal, and performs forward scanning on the medium, followed by backward scanning on the medium; and an image processor which determines a parameter that is used to estimate an amount of the show-through of the forward-scanned image, and removes the show-through of the forward-scanned image based on the backward-scanned image.

19. The apparatus of claim 18, wherein the image sensor adjusts a light intensity for the backward scanning to be lower than a light intensity for the forward scanning.

20. The apparatus of claim 18, further comprising a memory in which the forward-scanned image is stored.

21. The apparatus of claim 18, further comprising a memory in which a resulting image in which the show-through is removed by the image processor is stored.

22. . The apparatus of claim 18, wherein a characteristic of the backward scanning is adjusted based on the determined parameter.

23. The apparatus of claim 18, wherein the image sensor performs the backward scanning at a light intensity that is adjusted according to the parameter.

24. The apparatus of claim 23, wherein the image sensor adjusts the light intensity for the backward scanning to be lower than a light intensity for the forward scanning.

25. The apparatus of claim 18, wherein the image sensor performs the backward scanning at a resolution or a sensor characteristic that is adjusted according to the parameter.

26. The apparatus of claim 18, wherein the image sensor performs the backward scanning consecutively after the forward scanning.

27. The apparatus of claim 18, wherein the image sensor is one of a Charge-Coupled Device (CCD) image sensor and a CMOS Image Sensor (CIS) image sensor.

28. The apparatus of claim 18, further comprising a scanner motor moving the image sensor so as to perform the forward scanning and the backward scanning.

29. An image scanner comprising the apparatus of claim 18.

30. An apparatus for removing show-through of an image scanned by an image scanner, the apparatus comprising:

an image sensor which irradiates light onto a medium placed on a glass platen, detects reflected or penetrated light, generates an image signal of the medium, outputs the image signal, and performs forward scanning on the medium, followed by backward scanning; and an image processor which removes show-through of the forward-scanned image based on the backward-scanned image, wherein a resolution for the backward scanning is adjusted to be equal to or lower than a resolution for the forward scanning.

31. An apparatus for removing show-through of an image scanned by an image scanner, the apparatus comprising:

an image sensor which irradiates light onto a medium placed on a glass platen, detects reflected or penetrated light, generates an image signal of the medium, outputs the image signal, performs preview scanning on the medium, performs forward scanning on the medium after the preview scanning, and performs backward scanning after the forward scanning; and an image processor which determines a parameter that is used to estimate the amount of show-through of a preview-scanned image of the medium after the preview scanning, wherein the backward scanning is performed based on the parameter, and wherein the image processor removes show-through of the forward-scanned image based on the backward-scanned image.

32. The apparatus of claim 31, wherein a light intensity for the backward scanning is adjusted according to the parameter.

33. The apparatus of claim 32, wherein the image sensor adjusts a light intensity for the preview scanning to be equal to or lower than a light intensity for the forward scanning.

* * * * *